(12) United States Patent
Yu

(10) Patent No.: US 8,780,289 B2
(45) Date of Patent: Jul. 15, 2014

(54) LCD PANEL ASSEMBLY, LCD DEVICE AND METHOD FOR FIXING LCD PANEL

(75) Inventor: Gang Yu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 235 days.

(21) Appl. No.: 13/376,645

(22) PCT Filed: Dec. 2, 2011

(86) PCT No.: PCT/CN2011/083333
§ 371 (c)(1),
(2), (4) Date: Dec. 7, 2011

(87) PCT Pub. No.: WO2013/075350
PCT Pub. Date: May 30, 2013

(65) Prior Publication Data
US 2013/0128179 A1    May 23, 2013

(30) Foreign Application Priority Data
Nov. 21, 2011    (CN) .......................... 2011 1 0371565

(51) Int. Cl.
*G02F 1/1333*    (2006.01)
(52) U.S. Cl.
CPC ................................ *G02F 1/133308* (2013.01)
USPC .......................................................... 349/58
(58) Field of Classification Search
None
See application file for complete search history.

(56) References Cited

U.S. PATENT DOCUMENTS

| | | | |
|---|---|---|---|
| 6,741,298 B1* | 5/2004 | Won | 349/58 |
| 7,830,468 B2* | 11/2010 | Ahn | 349/58 |

FOREIGN PATENT DOCUMENTS

| | | |
|---|---|---|
| CN | 1637500 A | 7/2005 |
| CN | 2727785 Y | 9/2005 |
| CN | 101042485 A | 9/2007 |
| CN | 201429754 Y | 3/2010 |
| CN | 201859280 U | 6/2011 |
| JP | 8146269 A | 6/1996 |
| JP | 2000-305477 A | 11/2000 |
| JP | 2005-283863 A | 10/2005 |
| TW | 200817772 A | 4/2008 |

OTHER PUBLICATIONS

Zhang Zhi, the International Searching Authority written comments, Aug. 2012, CN.

* cited by examiner

*Primary Examiner* — Thanh-Nhan P Nguyen
(74) *Attorney, Agent, or Firm* — IPro, Inc.; Na Xu

(57) ABSTRACT

The present invention discloses an LCD panel assembly, an LCD device and a method for fixing the LCD panel. The LCD panel assembly comprises an LCD panel and a middle frame around the glass, wherein, an LCD module comprises a positioning element comprising a first positioning part and a second positioning part; the first positioning part contacts with an LCD panel and the second positioning part is fixed and connected to one end of the first positioning part. The present invention can omit a front frame of the LCD module, reduce the cost of the LCD module, and simplify the process of installing the fixed structure. Besides, the positioning element not only can match the middle frame to form the LCD module, but also can match the complete front frame to form the LCD device. Thus, the designing and manufacturing cost is to be further reduced with nice commonality and convenient assembling.

18 Claims, 5 Drawing Sheets

LCD PANEL ASSEMBLY, LCD DEVICE AND METHOD FOR FIXING LCD PANEL

TECHNICAL FIELD

The present invention relates to the field of liquid crystal displays (LCDs), and more particularly to a liquid crystal display (LCD) panel, an LCD device and a method for fixing the LCD panel.

BACKGROUND

As shown in FIG. 1, in the framework of an existing LCD module, a glass 200 is usually positioned on an LCD panel by a front frame 100, and the LCD module is matched with a complete front frame 500. Because the complete front frame 500 can position the glass 200 as well, and in fact, the glass 200 is required to be positioned during the transportation and the test, so the repositioning increases the designing cost of the LCD device.

SUMMARY

One aim of the present invention is to provide a mode for simplifying the fixing process of a glass on an LCD panel, an LCD panel assembly for reducing the cost of an LCD module and an LCD device, as well as a method for fixing the LCD panel.

The aim of the present invention is achieved by the following technical schemes.

An LCD panel assembly comprises an LCD panel and a middle frame around the glass, wherein, the LCD module comprises a positioning element comprising a first positioning part and a second positioning part; the first positioning part contacts with the LCD panel and the second positioning part is fixed and connected to one end of the first positioning part.

Preferably, the first positioning part is provided with a first hole which can facilitate the positioning element to be fixed by a screw to the middle frame of the LCD module or a complete front frame with an LCD device.

Preferably, the first hole is extended to another end relative to a fixed position from the fixed position. The first hole is in a long-strip shape, and when fixing, the first hole has a certain of fitting allowance. Thus, the first hole is able to apply to the LCD module and the LCD device of different dimensions.

Preferably, the second positioning part is provided with a second hole which can facilitate the positioning element to be fixed by the screw to the middle frame of the LCD module or the complete front frame with the LCD device.

Preferably, the second hole is extended to another end relative to the fixed position from the fixed position. The second hole is in the long-strip shape, and when fixing, the second hole has a certain of fitting allowance. Thus, the second hole is able to apply to the LCD module and the LCD device of different dimensions.

Preferably, the first positioning part is axisymmetrical with the second positioning part with respect to the fixed position. By improving the commonality of the positioning element, the phenomenon that the production efficiency is reduced by misoperation during the installation can be effectively decreased.

Preferably, threaded holes are arranged on the surfaces of the middle frame, wherein the surfaces are opposite to the first positioning part and the second positioning part of the positioning element. The positioning element is fixed to one or two of the threaded holes by the screw. In this example, the positioning element has two fixed positions which can be randomly selected in accordance with different applications. Thus, the applicability of the positioning element is improved.

An LCD device comprises a complete front frame and a backplane located on the back of the complete front frame. Wherein, the complete front frame comprises an LCD panel assembly; the LCD device also comprises a positioning element comprising a first positioning part and a second positioning part; the first positioning part contacts with the backplane; and the second positioning part is fixed and connected to the first positioning part.

Preferably, the first positioning part is provided with a first hole which can facilitate the positioning element to be fixed by a screw to a middle frame of an LCD module or the complete front frame with the LCD device.

Preferably, the first hole is extended to another end relative to a fixed position from the fixed position. The first hole is in a long-strip shape, and when fixing, the first hole has a certain of fitting allowance. Thus, the first hole is able to apply to the LCD module and the LCD device of different dimensions.

Preferably, the second positioning part is provided with a second hole which can facilitate the positioning element to be fixed by the screw to the middle frame of the LCD module or the complete front frame with the LCD device.

Preferably, the second hole is extended to another end relative to the fixed position from the fixed position. The second hole is in the long-strip shape, and when fixing, the second hole has a certain of fitting allowance. Thus, the second hole is able to apply to the LCD module and the LCD device of different dimensions.

Preferably, the first positioning part is axisymmetrical with the second positioning part with respect to the fixed position. By improving the commonality of the positioning element, the phenomenon that the production efficiency is reduced by misoperation during the installation can be effectively decreased.

Preferably, the threaded holes are arranged on the surfaces of the complete front frame, wherein the surfaces are opposite to the first positioning part and the second positioning part of the positioning element. The positioning element is fixed to one or two of the threaded holes by the screw. In this example, the positioning element has two fixed positions which can be randomly selected in accordance with the different applications. Thus, the applicability of the positioning element is improved.

A method for processing the aforementioned LCD device comprises the processes of assembling the LCD panel assembly and the LCD device. The process of assembling the LCD panel assembly comprises: installing the positioning element on the middle frame. The process of assembling the LCD device comprises: removing the positioning element from the middle frame; embedding the LCD panel assembly in the complete front frame; and installing the positioning element on the complete front frame.

The present invention, by using the positioning element to fix the LCD panel, can fix one or two of the first positioning part and the second positioning part of the positioning element to the middle frame of the LCD module or the complete front frame with the LCD device, and use the first positioning part to clamp the glass on the LCD panel. Thus, the front frame of the LCD module can be omitted, the cost of the LCD module is reduced, and the process of installing the fixed structure is simplified. Besides, the positioning element not only can match the middle frame to form the LCD module, but also can match the complete front frame to form the LCD

Wherein: 600. positioning element; 610. first positioning part; 620. second positioning part; 630. first hole; 640. second hole; 100. front frame; 200. glass; 300. middle frame; 400. Back frame; 500. complete front frame; 510. positioning hole; 700. screw.

DETAILED DESCRIPTION

The present invention will further be described in detail in accordance with the figures and the preferred examples.

Figure 1:
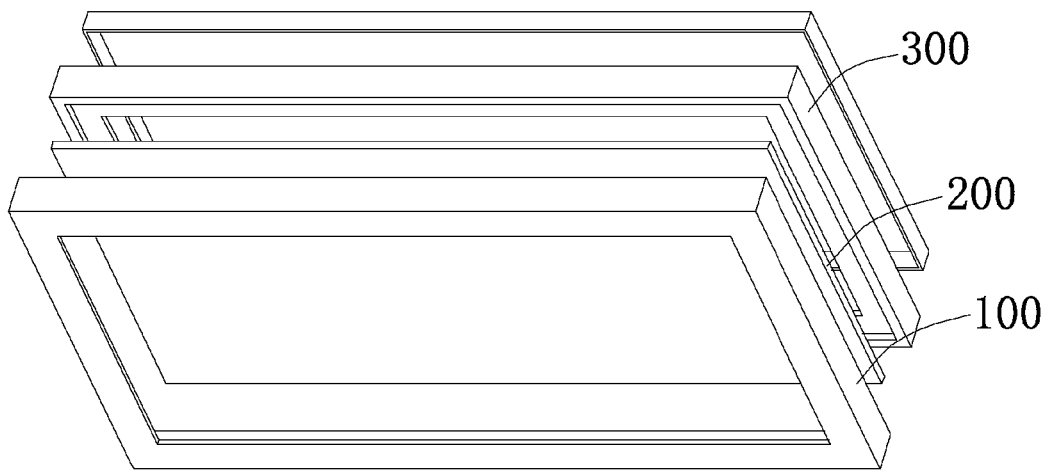
FIG. 1 is a structural diagram of an existing LCD module.
Figure 2:
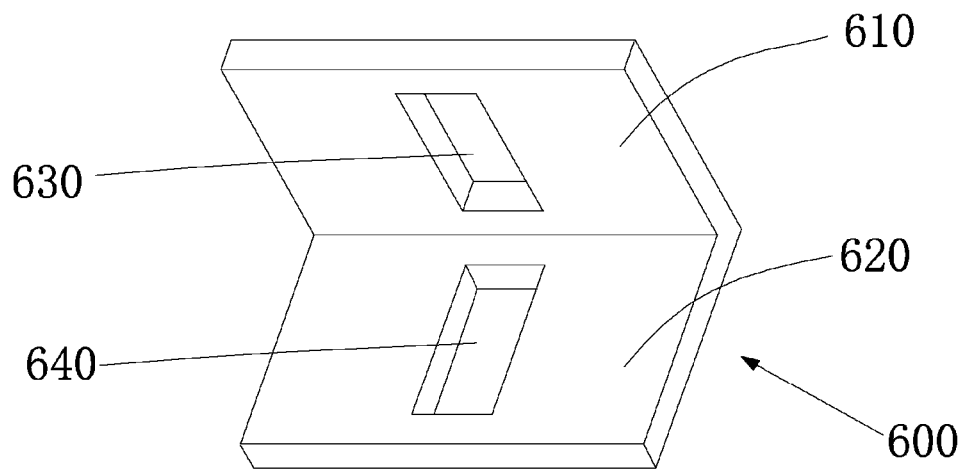
FIG. 2 is a schematic diagram of a positioning element of the present invention.

A positioning element 600 of a glass 200 on an LCD panel is as shown in FIG. 2. The positioning element 600 comprises a first positioning part 610 and a second positioning part 620, wherein the first positioning part contacts with the glass 200; the second positioning part 620 is opposite to a middle frame 300 of an LCD module or a complete front frame 500 of an LCD device; and the end of the positioning element 600 is an end of fixing and connecting the first positioning part 610 and the second positioning part 620.

The first positioning part 610 is axisymmetrical with the second positioning part 620 with respect to the fixed position. The first positioning part 610 is provided with a first hole 630 which is extended to another end relative to a fixed position from the fixed position. Correspondingly, the second positioning part 620 is provided with a second hole 640 which is extended to another end relative to the fixed position from the fixed position. Of course, the first positioning part 610 and the second positioning part 620 are not symmetrical and the holes also are sealed. Thus, the LCD panel is fixed directly by riveting, bonding, etc.

If the first positioning part 610 is symmetrical with the second positioning part 620, the commonality of the positioning element can be improved, and the phenomenon that the production efficiency is reduced by misoperation during the installation can be effectively decreased. The first hole 630 and the second hole 640 are extended to another end relative to the fixed position from the fixed position. The holes are in the long-strip shape, and one or two of the holes are fixed to the LCD module or the LCD device. Thus, the holes in the long-strip shape are able to apply to the LCD module or the LCD device of different dimensions. The applications of the positioning element 600 on the LCD panel assembly and the LCD device will be described respectively.

EXAMPLE 1

Figure 3:
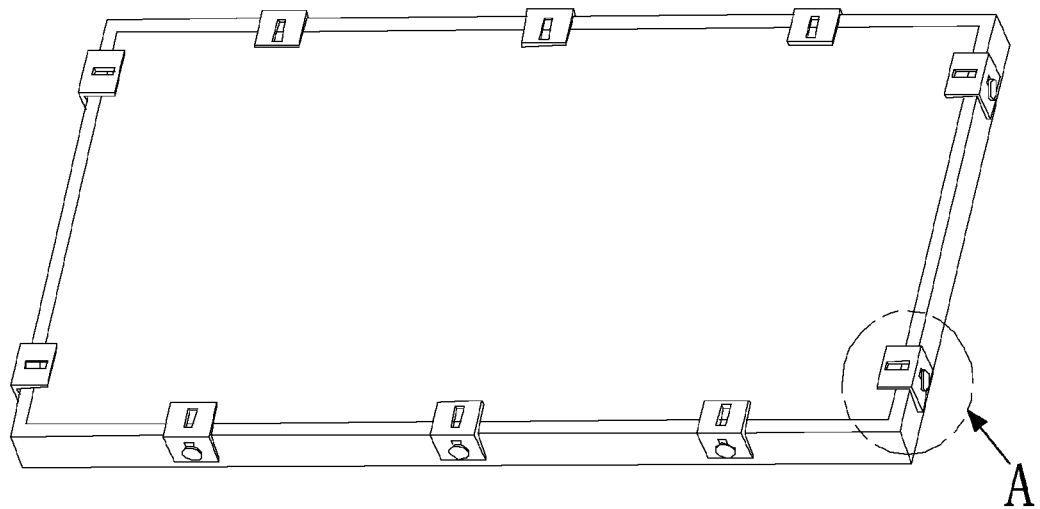
FIG. 3 is a schematic diagram of an LCD module of the present invention.
Figure 4:
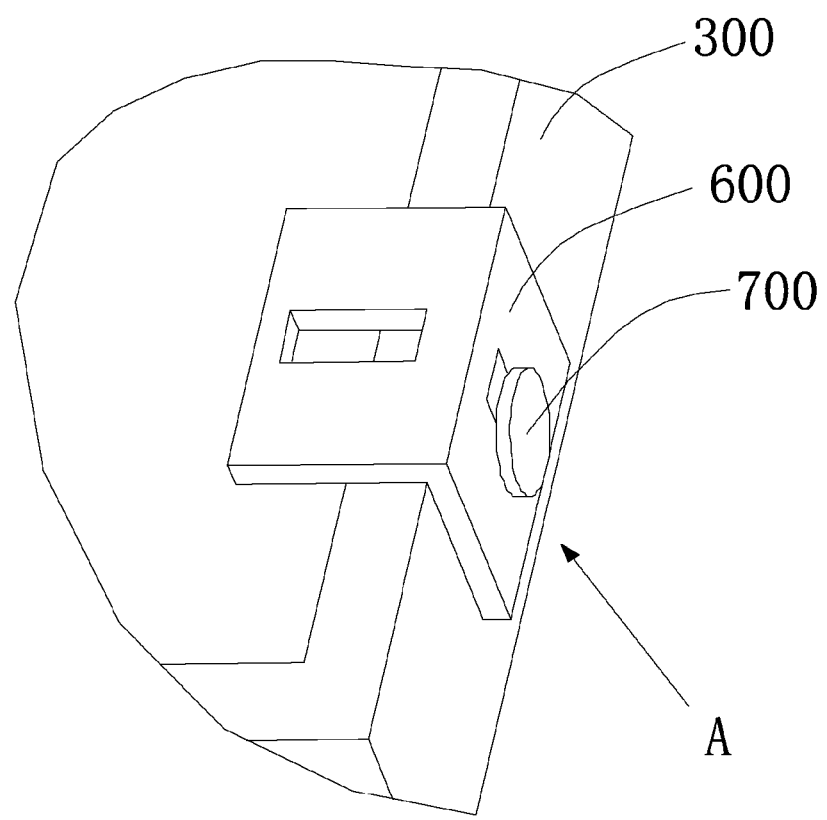
FIG. 4 is a partial enlarged view of A in FIG. 3.

As shown in FIG. 3 and FIG. 4, an LCD panel assembly comprises a glass 200 on an LCD panel and a middle frame 300 around the glass 200, wherein the threaded hole is arranged on the surface of the middle frame 300, wherein the surface is opposite to a second positioning part 620 of a positioning element 600; and the positioning element 600 is fixed to the middle frame 300 by a screw 700. The number of the positioning element 600 is determined in accordance with the design requirements. The positioning element 600 and the middle frame 300 not only can be fixed together by the screw 700, but also can be connected by other positioning modes, such as tripping. The positioning element 600 can compact the glass 200 to replace the front frame 100 in traditional design. Of course, the threaded hole is also arranged on the surface of the middle frame 300, wherein the surface is opposite to the first positioning part 610 of the positioning element 600; and the positioning element 600 is fixed by the screw 700.

EXAMPLE 2

Figure 5:
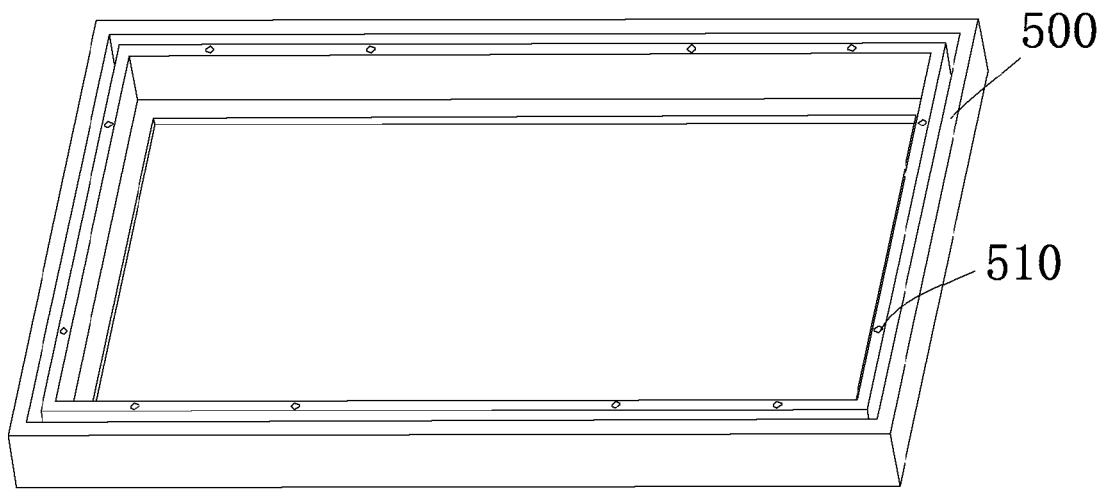
FIG. 5 is a schematic diagram of a complete front frame of the present invention.
Figure 6:
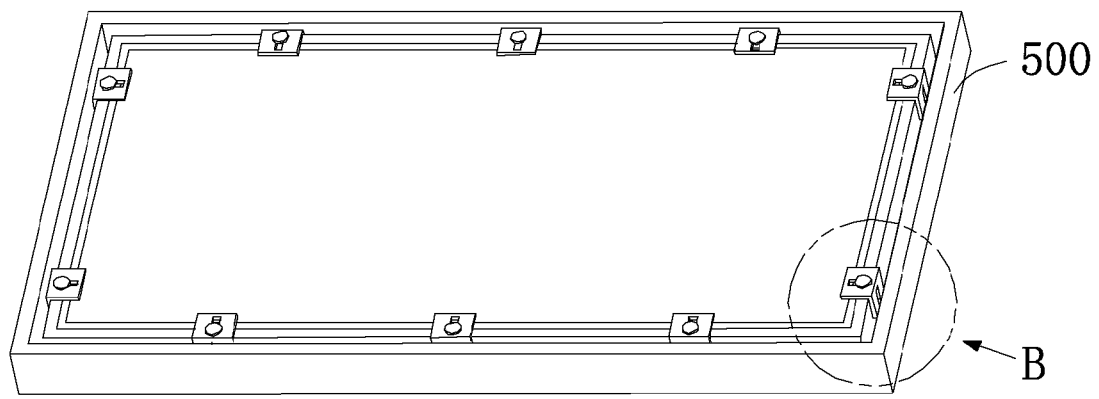
FIG. 6 is a schematic diagram of an LCD device of the present invention.
Figure 7:
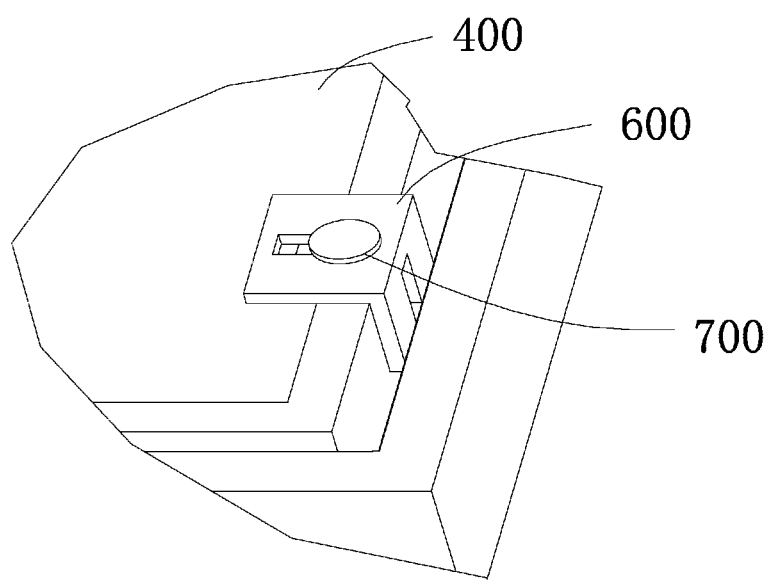
FIG. 7 is a partial enlarged view of B in FIG. 6.
Figure 8:
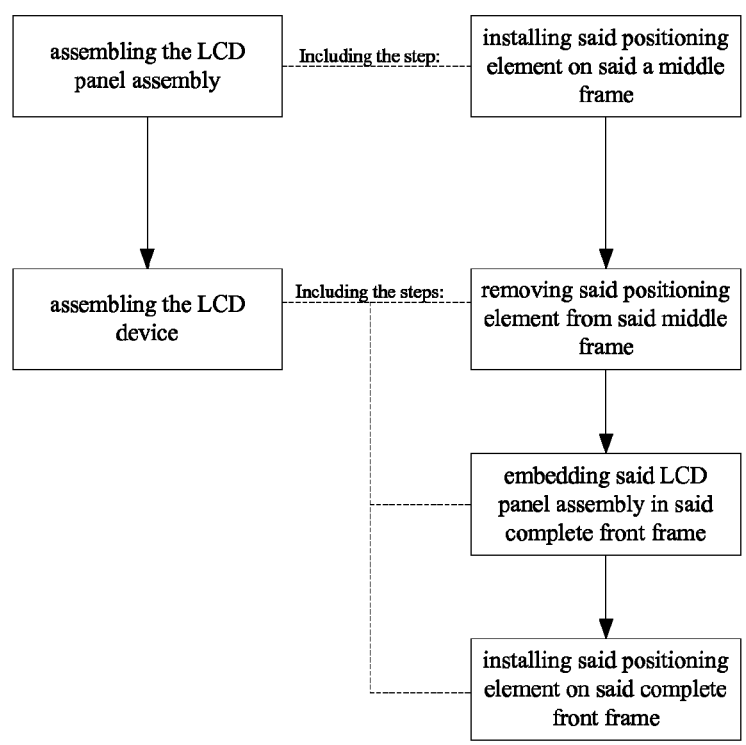
FIG. 8 is a flew diagram of a method for processing the LCD device.

As shown in FIG. 5 to FIG. 7, an LCD device comprises a complete front frame 500, the complete front frame is provided with a positioning hole 510 for fixing the positioning element, and the positioning hole 510 also can be arranged on the side of the complete front frame. The complete front frame 500 comprises an LCD module which comprises a glass 200 on an LCD panel, a middle frame 300 around the glass 200, and a back frame 400 bearing the middle frame 300 and the glass 200. A threaded hole is arranged on the surface of the middle frame 300, wherein the surface is opposite to the first positioning part 610 of the positioning element 600, the positioning element 600 is fixed by a screw 700, and then the complete front frame 500 and the LCD module is fixed. The second positioning part 620 also can be arranged on the outer side of the complete front frame 500, in this way, the first positioning 610 can clamp the back frame 400 of the LCD module. Thus, the middle frame 300 and the glass 200 are fixed together by matching the front frame 500 with the back frame 400. The threaded holes are arranged on the surfaces of the complete front frame 500, wherein the surfaces are opposite to the first positioning part 610 and the second positioning part of the positioning element 600. And the positioning element 600 can be fixed to the complete front frame 500 through one or two of the threaded holes.

When positioning the complete device, the first step is to remove the positioning element 600 from the LCD module to install the complete front frame 500, and the next step is to fix the LCD module to the complete front frame 500 with the positioning element 600. The LCD device and the LCD module share the positioning element 600 to reduce the designing cost and the management cost of the components.

The present invention, by using a positioning element 600, can fix one or two of the first positioning part 610 and the second positioning part 620 of the positioning element 600 to the middle frame 300 of the LCD module or the complete front frame 500 with the LCD device, and use the first positioning part 610 to clamp the glass 200 on the LCD panel. Thus, the front frame 100 of the LCD module can be omitted, the cost of the LCD module is reduced, and the process of installing the fixed structure is simplified. Besides, the positioning element 600 not only can match the middle frame 300 to form the LCD module, but also can match the complete front frame 500 to form the LCD device. Thus, the designing and manufacturing cost is further reduced with nice commonality and convenient assembling.

The present invention is described in detail in accordance with the above contents with the specific preferred examples. However, this invention is not limited to the specific examples. For the ordinary technical personnel of the technical field of the present invention, on the premise of keeping the conception of the present invention, the technical personnel can also make simple deductions or replacements, and all of which should be considered to belong to the protection scope of the present invention.

The invention claimed is:

1. An LCD panel assembly, comprising: an LCD panel and a middle frame; the LCD panel comprising a glass, the middle frame around said glass; said LCD module comprises a positioning element comprising a first positioning part and a second positioning part; the first positioning part contacts with the LCD panel; and the second positioning part is fixed and connected to one end of the first positioning part, wherein said first hole is in a long-strip shape and extended to another end relative to a fixed position from the fixed position, and when fixing, the first hole has a certain of fitting allowance so as to apply to said LCD module of different dimensions.

2. The LCD panel assembly of claim 1, wherein said first positioning part is provided with a first hole.

3. The LCD panel assembly of claim 1, wherein said second positioning part is provided with a second hole.

4. The LCD panel assembly of claim 3, wherein said second hole is extended to another end relative to the fixed position from the fixed position.

5. The LCD panel assembly of claim 1, wherein said first positioning part is axisymmetrical with said second positioning part with respect to said fixed position.

6. The LCD panel assembly of claim 1, wherein threaded holes are arranged on the surfaces of said middle frame, and the surfaces are opposite to the first positioning part and the second positioning part of said positioning element; said positioning element is fixed to one or two of said threaded holes by a screw.

7. An LCD device, comprising: a complete front frame and a backplane located on the back of a complete front frame; said complete front frame comprises an LCD panel assembly; said LCD device also comprises a positioning element; said positioning element comprises a first positioning part and a second positioning part; the first positioning part contacts with the backplane; and the second positioning part is fixed and connected to the first positioning part, wherein said first hole is in a long-strip shape and extended to another end relative to a fixed position from the fixed position, and when fixing, the first hole has a certain of fitting allowance so as to apply to said LCD module and said LCD device of different dimensions.

8. The LCD device of claim 7, wherein said first positioning part is provided with a first hole.

9. The LCD device of claim 7, wherein said second positioning part is provided with a second hole.

10. The LCD device of claim 9, wherein said second hole is extended to another end relative to the fixed position from the fixed position.

11. The LCD device of claim 7, wherein said first positioning part is axisymmetrical with said second positioning part with respect to said fixed position.

12. The LCD device of claim 7, wherein threaded holes are arranged on the surfaces of the complete front frame, and the surfaces are opposite to the first positioning part and the second positioning part of said positioning element; said positioning element is fixed to one or two of said threaded holes by the screw.

13. A method for processing an LCD device, wherein the LCD device comprises a complete front frame and a backplane located on the back of a complete front frame; said complete front frame comprises an LCD panel assembly; said LCD device also comprises a positioning element; said positioning element comprises a first positioning part and a second positioning part; the first positioning part contacts with the backplane; and the second positioning part is fixed and connected to the first positioning part, wherein said first hole is in a long-strip shape and extended to another end relative to a fixed position from the fixed position, and when fixing, the first hole has a certain of fitting allowance so as to apply to said LCD module and said LCD device of different dimensions, the method comprises the processes of assembling the LCD panel assembly and the LCD device; said process of assembling the LCD panel assembly comprises: installing said positioning element on a middle frame; said process of assembling the LCD device comprises: removing said positioning element from said middle frame; embedding said LCD panel assembly in said complete front frame; and installing said positioning element on said complete front frame.

14. The method of the claim 13, wherein said first positioning part is provided with a first hole, the method comprises the processes of assembling the LCD panel assembly and the LCD device; said process of assembling the LCD panel assembly comprises: installing said positioning element on a middle frame; said process of assembling the LCD device comprises: removing said positioning element from said middle frame; embedding said LCD panel assembly in said complete front frame; and installing said positioning element on said complete front frame.

15. The method of claim 13, wherein said second positioning part is provided with a second hole, the method comprises the processes of assembling the LCD panel assembly and the LCD device; said process of assembling the LCD panel assembly comprises: installing said positioning element on a middle frame; said process of assembling the LCD device comprises: removing said positioning element from said middle frame; embedding said LCD panel assembly in said complete front frame; and installing said positioning element on said complete front frame.

16. The method of claim 15, wherein said second hole is extended to another end relative to the fixed position from the fixed position, the method comprises the processes of assembling the LCD panel assembly and the LCD device; said process of assembling the LCD panel assembly comprises: installing said positioning element on a middle frame; said process of assembling the LCD device comprises: removing said positioning element from said middle frame; embedding said LCD panel assembly in said complete front frame; and installing said positioning element on said complete front frame.

17. The method of claim 13, wherein said first positioning part is axisymmetrical with said second positioning part with respect to said fixed position, the method comprises the processes of assembling the LCD panel assembly and the LCD device; said process of assembling the LCD panel assembly comprises: installing said positioning element on a middle frame; said process of assembling the LCD device comprises: removing said positioning element from said middle frame; embedding said LCD panel assembly in said complete front frame; and installing said positioning element on said complete front frame.

18. The method of claim 13, wherein threaded holes are arranged on the surfaces of the complete front frame, and the surfaces are opposite to the first positioning part and the second positioning part of said positioning element; said positioning element is fixed to one or two of said threaded holes by the screw, the method comprises the processes of assembling the LCD panel assembly and the LCD device; said process of assembling the LCD panel assembly comprises: installing said positioning element on a middle frame; said process of assembling the LCD device comprises: removing said positioning element from said middle frame; embedding said LCD panel assembly in said complete front frame; and installing said positioning element on said complete front frame.

* * * * *